United States Patent [19]

Mischler

[11] Patent Number: 5,608,445
[45] Date of Patent: Mar. 4, 1997

[54] METHOD AND DEVICE FOR DATA CAPTURE IN TELEVISION VIEWERS RESEARCH

[75] Inventor: Peter Mischler, Biel, Switzerland

[73] Assignee: SRG Schweizerische Radio- und Fernsehgesellschaft, Bern, Switzerland

[21] Appl. No.: 372,583

[22] Filed: Jan. 13, 1995

[30] Foreign Application Priority Data

Jan. 17, 1994 [CH] Switzerland .................. 00134/94

[51] Int. Cl.⁶ ....................................... H04N 7/00
[52] U.S. Cl. ....................................... 348/4; 348/725
[58] Field of Search ................... 348/1–5, 10, 13, 348/6, 7, 9, 465, 468, 725; H04N 7/00, 7/10

[56] References Cited

U.S. PATENT DOCUMENTS

| | | | |
|---|---|---|---|
| 3,919,479 | 11/1975 | Moon et al. | 348/4 |
| 4,068,264 | 1/1978 | Pires | 348/1 |
| 4,388,644 | 6/1983 | Ishman et al. | 348/4 |
| 4,425,578 | 1/1984 | Haselwood et al. | 348/731 |
| 4,574,304 | 3/1986 | Watanabe et al. | 348/1 |
| 4,577,220 | 3/1986 | Laxton et al. | 348/1 |
| 4,599,644 | 7/1986 | Fischer | 348/4 |
| 4,622,583 | 11/1986 | Watanabe et al. | 348/1 |
| 4,723,302 | 2/1988 | Fulmer et al. | 348/1 |
| 4,739,406 | 4/1988 | Morton et al. | 348/5 |
| 4,764,808 | 8/1988 | Solar | 348/4 |
| 4,885,632 | 12/1989 | Matey et al. | 348/5 |

Primary Examiner—Michael Lee
Attorney, Agent, or Firm—Richard Linn

[57] ABSTRACT

A device for the monitoring of a video installation is disclosed which does not need any intervention into the video sets (television set (4), video recorders (2, 3)). Signal pulses are superimposed on the television or the video signals at the antenna connection (1) and/or the video inputs (7, 8, 10). The superimposition is effected synchroneously to the signal appearing at the respective input (1, 7, 8, 10) in the range of the picture information of a preferably invisible picture line under the control of a processor (14). The burst may also be used for the introduction of digital data which characterize the television or video signal. The retrieval of the burst at the television set (4) is effected either at its video output (10) or by means of a probe (19) fastened at the exterior near the picture tube. For determining the programme reproduced by the television set (4), the presence of the burst as such or the data it contains are sufficient.

15 Claims, 4 Drawing Sheets

METHOD AND DEVICE FOR DATA CAPTURE IN TELEVISION VIEWERS RESEARCH

The present invention is related to a method for determining the channel selection in a video installation comprising at least one television set and/or one video recorder and at least one input connection for a television signal, by local injection of an identification signal into the television signal. The invention is further related to devices for carrying out the method in order to monitor the activity of the sets of a video and television installation.

BACKGROUND OF THE INVENTION

Data regarding the television viewers research are nowadays very often gathered by automatic monitoring systems. These devices comprise sensors (or probes) on the individual appliances which report the operating condition to a central monitoring station. There exist probes which directly determine the adjustment of the tuners of a television set (abbreviated: TV) or of a video recorder (abbreviated: VCR) and furthermore determine the television programme actually tuned in through a list of locally receivable television stations. These probes, however, have to be adapted to the particular appliance, and this is extremely expensive in view of the great variety of today's appliances.

One object of the present invention is to provide a method and a device for automatically determining the condition of a video installation which does not need any intervention in the monitored appliances.

SUMMARY OF THE INVENTION

This object is fulfilled by the method and the device of the present invention. The method comprises the superimposition of the identification signal on the video component of the television signal of a channel in the form of a burst, and the reception of said channel in one of the sets of the video installation is concluded from the presence of the identification signal in an output signal or in a stray signal of the set.

The device comprises a so-called plug-in adapter. It is generally connected to a central unit whose functions are: data recording, connection to a central computer via a modem, and the storing and updating of a channel concordance list of the stations or the programmes, respectively. The term "plug-in" indicates that the connection to all appliances which are monitored by this plug-in adapter, is effected without intervention in the respective appliances. For sake of simplification, this plug-in adapter will be termed as PIA in the following.

The PIA monitors the status of all sets which are directly or indirectly connected to a particular cable television or antenna connection, called in the following "TV connection". To this end, the PIA is connected to every appliance, as far as necessary, in a manner still to be described.

In order to determine to which channel a set is tuned, the PIA supplies a special signal to the TV connection which is introduced into the video component of the television signal, and in such a manner that no disturbance can be noticed during the display of the television signal on the screen. This is accomplished by inserting the signal into the invisible lines at the beginning and the end of a television picture. The signal is composed either of a pulse or a burst which is preferably shaped as a sine signal as perfect as possible in order to ascertain a good recognizability and to reduce possible disturbances, and which extends over a great portion of a certain one of the above mentioned, preferably invisible image lines.

In a second embodiment, the burst is additionally amplitude modulated, i.e. in the simplest case, it is switched on and off, this modulation comprising simultaneously a binary coded information. For example, one byte can be introduced per screen line into the video signal. The information thus introduced into the video signal may be the following: time, date, channel number, frequency, transmitter or broadcast station identification, programme, etc.

The use of such a burst in the video signal presents the advantage that it is recorded also by VCRs and can be identified anew during reproduction of the recorded television signal; the information contained in the modulated form of the burst can be read again, and it becomes thus possible to determine which programme has been recorded. With respect to older VCRs which have a limited band width, it has been found that a frequency of e.g. 2 MHz may be selected for the burst which can be recorded without any problem by these sets, too.

The television signal loaded with the burst is now used to determine whether a set of the video installation is switched on, and on which channel it is tuned. More modern television sets and VCRs comprise video outputs or SCART connections where a video signal may be picked up which corresponds to the television signal actually displayed or recorded by the VCR, respectively, and/or to the looped-through television signal.

In older television sets, there is often an antenna pickup only. In these sets, the new probe for beam following is used. It can also function to roughly determine the light/dark adjustment of a television set. The probe responds to the electromagnetic and magnetic fields originating from the beam currents, the modulation of the accelerating voltage by the electron beam and from the magnetic deflecting units of the picture tube. It is composed of two flat coils disposed in parallel relationship which are connected together in such a manner that their inductive effects, namely the occasionally induced voltages, are added up. The coils thus form, on one hand, a coil for receiving the magnetic stray fields, and, on the other hand, a capacitor whose two plates are formed by the two coils. The d.c. current short circuit of the two capacitor plates is broken by the reactance of the coils at increasing frequencies. Since the higher frequency portions only, which also contain the burst, are of interest in the captured electric stray fields, they produce a clear signal. The probe signal is collected at the two other ends of the two coils.

Surprisingly, the separation of the signal of the probe is simply possible by means of filters. One obtains, with sufficient precision, the position of the horizontal synchronization signal, the vertical synchronization signal, and the burst, be it in the modulated or in the unmodulated form. The horizontal synchronization signal and the vertical synchronization signal allow the definite beam tracing and thus, inter alia, the determination of the time where the burst should occur. For determining the channel, the mere presence of the burst signal or the information contained therein can be used.

Since the probe has to rely on the beam current being switched on during the picture line used for the burst injection, it may be necessary with some TV types to select a picture line which is in the visible range. These TV sets switch the beam current off during the invisible picture portion, e.g. for proceeding with an automatic adjustment of the beam current. However, such sets are generally of the more recent type which also have a video output so that the use of a probe is not necessary.

The attribution of the channels to transmitters or programmes may be made by means of a list which is stored in the PIA or in the central unit. Many programmes or transmitters already provide a usable identification. In the simplest form, this is the VPS signal which contains among others a definite transmitter identification. A second possibility is given by the simultaneously transmitted teletext which contains the broadcast station logo in the status line from which it is possible to know the transmitter or the programme.

The invention will now be further explained by means of an embodiment thereof in making reference to the drawing.

DETAILED DESCRIPTION OF THE INVENTION

Figure 1:
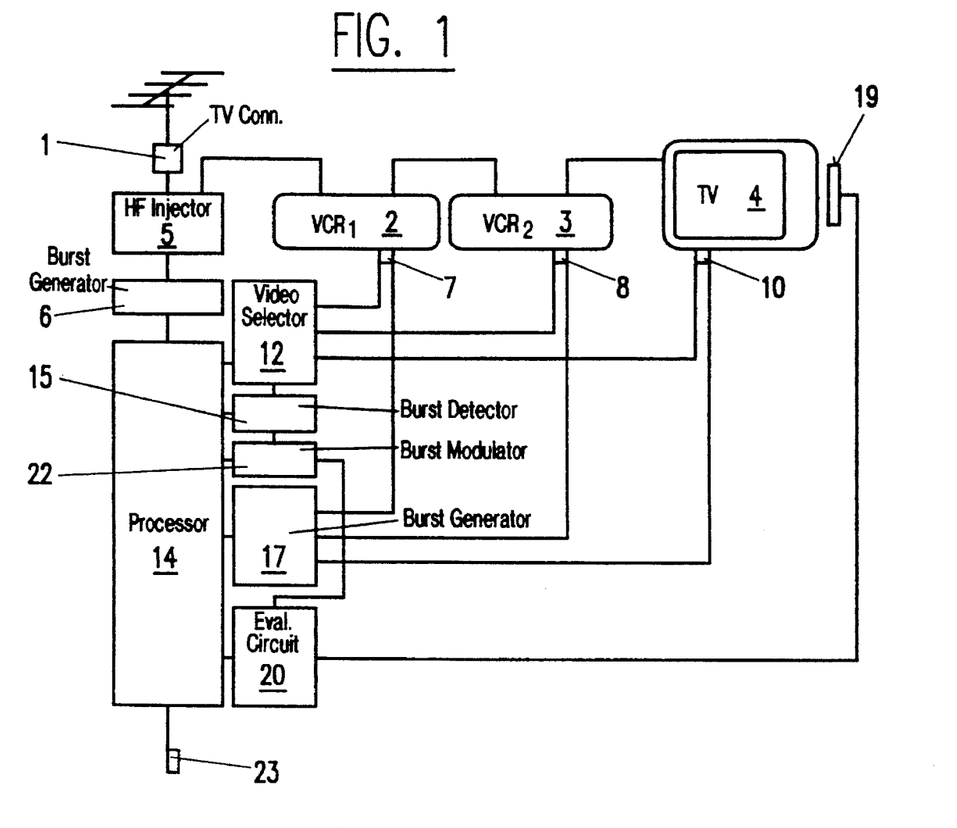
FIG. 1 shows the block diagram of a plug-in adapter together with the monitored video installation.

FIG. 1 shows the block diagram of a plug-in adapter and the schematically represented video chain which it monitors and which is provided with a television signal by a common television connection 1. The video chain consists in the present case of two video recorders (VCRs) $VCR_1$ 2 and $VCR_2$ 3, and a television set 4. The television signal coming from the television connection 1 is first supplied to the HF injector 5. This television signal carries signals in the range of, e.g., 40 to 900 MHz. The HF injector 5 serves to inject the burst signal into the television signal, to pass the modified television signal to the following video chain, and to effect a decoupling of the device from the television connection I so that the bursts do not escape to the exterior via the television connection 1. The HF injector 5 is adapted to the modulation mode of the picture information; in the now used technique of amplitude modulation of the picture carrier by the video signal, an addition of the two signals will be sufficient.

The burst is produced by a burst generator 6 which supplies a sine shaped wave signal of low harmonic content and which can be adjusted to any frequency in the range of the receivable channels. Its frequency is always offset by a constant value with respect to the picture carrier of the television signal in which the burst is to be incorporated, by means of the processor 14.

The modified television signal is now transmitted successively to the two video recorders $VCR_1$ 2 and $VCR_2$ 3 and finally to the television set 4. With the today's video recorders, this is also the case if a programme recorded on video cassette by one of the video recorders (VCRs) 2 or 3 is displayed, i.e. if the tuner of the television set is tuned to a channel used by one of the video recorders, and this video recorder is playing the cassette.

The synchronization of the burst to the video signal originating from the cassette is guaranteed here too since the synchronization is derived from the reproduction on the television set 4 which is in turn synchronous with the video signal coming from the cassette. Thus, it can be determined that one of the video recorders 2 or 3 is set for reproduction from cassette, and that the television set is displaying this reproduced video signal, and this independently of the content of the cassette, if the burst signal can only then be detected at the television set 4 when it is supplied to one of the output channels of the video recorders 2 or 3, respectively.

Since, if the displayed video signal does not contain data bursts, i.e. if it has not been recorded on a video installation equipped according to this invention, it is not possible to automatically identify the displayed content, there is no disadvantage in that it cannot be determined from which video recorder the output signal is displayed if more than one video recorder are connected. In such a case, the information about the content of the cassette may be called up from the user through a conventional questioning and input unit if this is necessary. Such questioning and input units are known per se.

The monitoring of the two video recorders is performed through their video outputs 7 and 8, respectively. If the television set is equipped in turn with a video connection 10, the television set 4 may also be monitored via this connection 10. The output lines of the video connections 7, 8, 10 are separately connected to a video selector 12 which selects, under control of the processor 14, one of the video signals and switches it through to the burst detector 15.

The burst detector 15 determines whether a burst is present in the video signal, and whether it is modulated with data, and passes the result to the processor 14. Preferably, these functions are largely carried out by the processor 14 itself. The burst detector 15 which has to be synchronized with the line and picture repetitions, and the burst modulator 22 are preferably integrated into the processor 14.

In order to integrate also the possibility of feeding a pure video signal into the device, the inputs of the video connections 7, 8, 10 are further connected to a burst generator 17 having switchable outputs which are in turn controlled by the processor 14. This burst generator 17 synchronizes itself on the external video signal present on the respective video input 7, 8 or 10 and injects the burst into this video signal.

If the television set 4 is not provided with a video socket 10, the probe 19 which may be disposed at the exterior, is used. It has preferably the shape of a disk or a plate and is fastened best to the housing of the television set 4 in the proximity of the picture tube base. The stray signal emitted by the picture tube and captured by the probe 19 is passed to the evaluating circuit 20. This circuit contains essentially three filters: a filter having a passing frequency of 2 MHz which separates a signal corresponding to the video information of the lines and which optionally also contains the burst; a filter for the line repetition frequency (in Europe: 15.625 kHz), which separates a signal corresponding to the line repetition, this signal containing characteristic portions especially for the horizontal beam flyback; and a filter for the picture repetition rate or, more precisely, the frame or half picture repetition rate (in Europe: 50 Hz) which filters out a signal corresponding to the picture repetition, i.e. the vertical beam flybacks, having marked portions for the vertical beam flyback. The synchronization signals are passed to the processor 14. The burst signal is fed, as well as the signal coming from the burst detector, to a burst modulator 22 which provides information to the processor whether a simple burst, no burst or a data modulated burst have been detected. In the latter case, it carries also out the data demodulation and passes these data to the processor 14, too.

If a burst is detected at the television set 4, and if this burst is modulated with data, the processor 14 is able to directly detect the programme actually viewed by the viewers. If the burst is not data modulated, the processor determines which one of the burst injecting units, i.e. the HF injector 5 or the burst generator 17, to generating a burst and, in the case of the burst generator 17, into which video input this signal is injected. By means of the result of this evaluation, it determines if a video programme is viewed which is fed in through one of the video inputs 7 or 8, or if a programme is viewed which is coming from the television connection 1, it being possible, since the HF injector 5 selectively injects the burst into the channel, to determine also the channel by the channel tuning of the HF injector.

The processor recognizes the reproduction of a programme recorded on a cassette in that it detects a data modulated burst at the television set 4, but that no one of the external television connections is the source of this burst, i.e. neither the television connection 1 nor any of the video inputs 7, 8 or 10.

This information is passed for storing or otherwise evaluating through the connection 23 to a central unit as it is known from the presently used monitoring systems.

Figure 2:
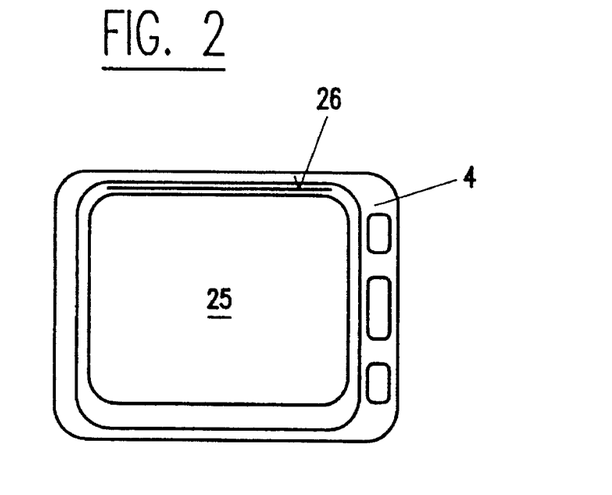
FIG. 2 shows a schematical front view of a television set, FIG. 3 schematically shows the data modulation of the burst.
Figure 3:
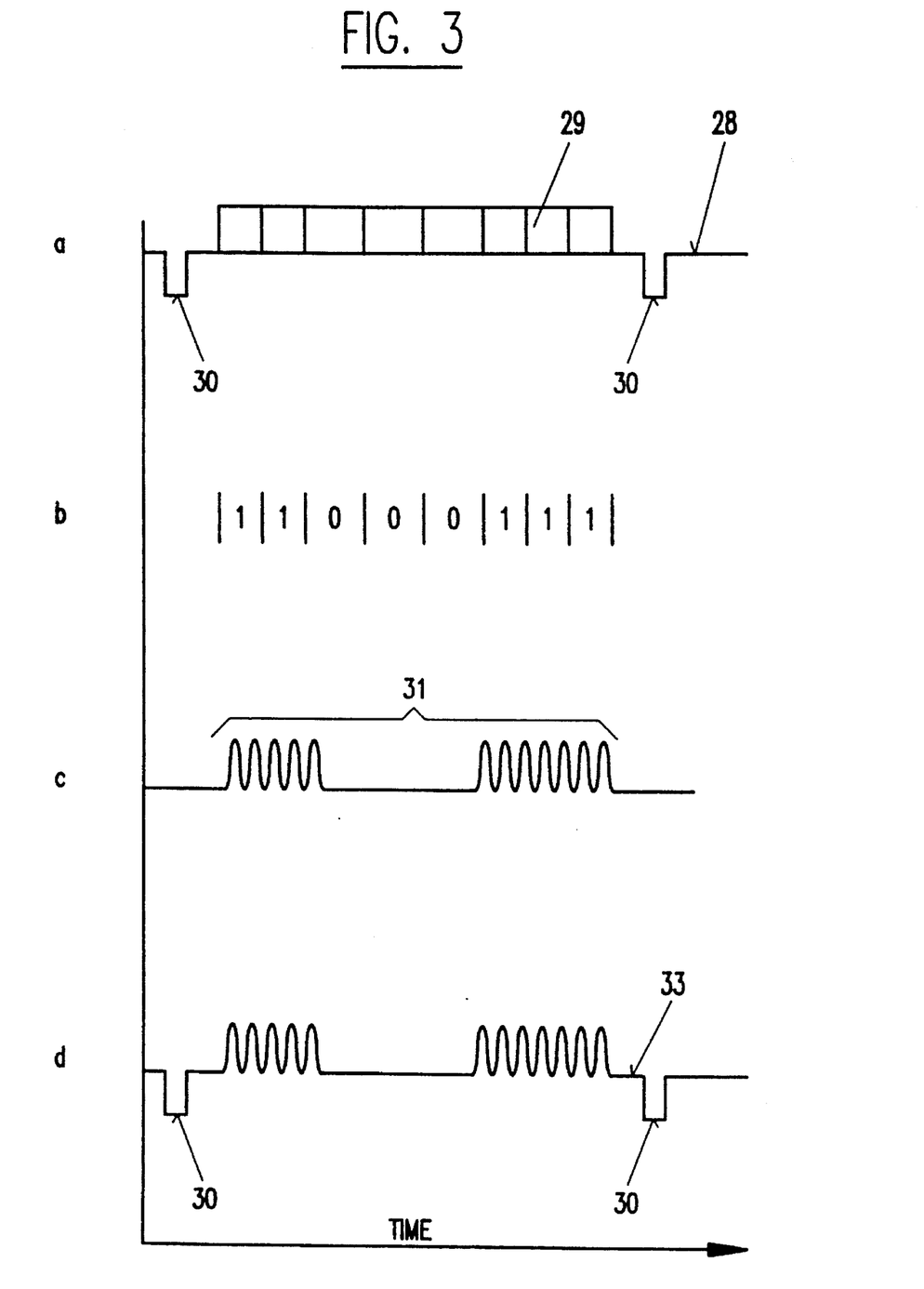

With reference to FIG. 2 and 3, the burst will now be described more precisely. FIG. 2 shows a schematical view of the television set 4 having a useful range 25 for the television picture display of the picture tube and the 23rd picture line 26 selected as an example. This picture line lies above the useful range 25 of the picture tube. One could of course also select a line below this area 25, but it is more appropriate to select invisible lines shortly following the vertical synchronization signal which are above the visible area 25 since the vertical synchronization pulse produces a flyback of the beam to the top. For these picture lines, only a small number of lines need to be counted after the vertical synchronization pulse, thus reducing the risk that a wrong picture line is analysed for the burst due to a picture line counting error.

The burst consists for example of a simple high frequency signal of 2 MHz. FIG. 3a shows the original video signal 28 of the used picture line 26 together with the time pattern indicated in the form of tiny boxes 29 for the data modulation of the burst. The time pattern 29 has a total length of 40 microseconds at a line duration including the horizontal synchronization pulse 30 (H pulse) of 64 microseconds. Each of the boxes of the time pattern 29 represents a time duration of 5 microseconds corresponding to 10 burst oscillations at a burst frequency of 2 MHz. In the case of a burst being not data modulated, the burst is simply injected during the total duration of the time pattern 29, thus during at least 40 microseconds, into the video signal which corresponds, as it will be shown later, to a bit sequence of ones exclusively (or zeros depending on the coding). As to the data encoding of the burst signal, this bit sequence must thus represent an impossible combination or the burst must have an overlength in order to distinguish it from a 11111111 data burst. Encodings which fulfill these requirements are easily to be found in the field of computer data transmission.

A simple method for distinguishing of the data modulated burst from the unmodulated burst consists in selecting the unmodulated burst to be one bit longer in time than the time duration provided for the data modulated burst.

FIG. 3b shows an example of a bit sequence to be encoded (11000111). FIG. 3c shows the burst signal 31 generated from this bit sequence, and FIG. 3d finally shows the video signal 33 comprising the injected, data modulated burst.

The status monitoring of a television set is now explained with reference to FIG. 4. For sake of simplicity, a television set is considered which is directly connected to a television connection. The television signal is fed from the television connection I through the HF injector 5 to the antenna connection 41 of the TV. The decoupling amplifier 42 and the coupler 43 which will couple the burst signal into the television signal are indicated in the HF injector 5. The burst signal is generated by the two VCOs 45 and 46 which produce a continuous sine signal of low harmonic content whose frequency is adjustable. The two VCOs cover different frequency ranges: the VCO 45 is designed for frequencies from 40 to 450 MHz, and the VCO 46 for the frequency range of 450 to 1000 MHz. The frequency of the signals supplied by the two VCOs (voltage controlled oscillators) is adjusted by the processor 14 to a value which is offset, for a 2 MHz burst, by 2 MHz to higher frequencies with respect to the picture carrier. The processor 14 selects through the HF switch 48 the signal of one of the two VCOs as a burst injecting signal.

The use of two VCOs instead of only one is necessary at the present state of the art in order to produce a low harmonics burst injecting signal as "clean" as possible where the first and all other higher harmonics are attenuated by at least 40 dB with respect to the fundamental oscillation. The same applies of course to all other stray signals.

A HF level controller 50 follows the switch 48. It serves for adapting the amplitude of the burst injecting signal to the television signal. The adjustment of the burst injection signal to the average signal level of the television signal at the coupler 43 has proven being an optimum. The output signal of the HF level controller 50 is passed to the HF injector 5 via a second HF switch 52. The HF switch 52 is switched on by the processor 14 when the burst signal should appear in the video signal, i.e. when the selected, invisible picture line is going to be transmitted.

In the present example, this moment is determined from the signal taken from the television set. Since time lags may occur on the transmission path from the television connection or the HF injector 5, respectively, until the picking up of the monitoring signals, it is advantageous for the burst not to occupy the entire length of a picture line. The margin in the position of the burst thus obtained is normally sufficient to cope for these time lags. Additionally, a calculated compensation by the processor 14 can be made. Since a certain arrangement of a video chain will normally not be changed further, these time lags which essentially only depend on the sequence of the appliances, are constant and can be taken into account for the control of the HF switch 52. Since the device is synchronized on the television signal in the channel to be tested, one burst per channel may already be sufficient for determining whether this channel is tuned on.

The television signal carrying the burst is first transmitted in the television set 4 to the usual HF, IF and demodulator stages 54, and the respective outputs separately provide the sound signal 55 and the video signal 56. In more modern sets, these two signals 55 and 56 are accessible at an external video connection 10 and can be picked up for the monitoring of the appliance status. Since the video connection may also be used for the input of video (and audio) signals, e.g. from a video recorder or a video camera, the input sockets must normally be connected to the monitoring system, too.

The video signal is passed from the video output socket 66 to the video selector 12 which serves for switching between different video signal sources, and it comprises, further to the one connection shown, a number of other inputs (not shown). The output signal of the video recorder goes to a filter 64 having a pass frequency of 2 MHz, a band width of 200 kHz and a transient time of less than 1 μs (microsecond). This filter is furtheron activated by the processor 14 only during that time interval wherein the burst may appear in the video signal in order to avoid an overdrive by the normal video signal. The filter 64 is followed by a comparator 65 which produces at the output, dependent on the presence or the absence, respectively, of the burst signal, a corresponding logic signal, e.g. +5 V for the presence of the burst signal and 0 V for its absence. The output signal of the video selector 12 is also fed to the synchronization detector 67 which detects the horizontal and vertical synchronization pulses and transforms them into the synchronization signals for the line and picture repetition 69 respectively 70 which are required by the processor 14. The output signal of the comparator 65 as well as the output signals of the synchronization detector 67 are passed to selection switches 72 allowing the commutation between the evaluation of a direct video signal, just as described above, and that of the signal of the probe 19.

If there is a possibility that an additional video signal is fed to such a video input 74, the video input 74 is additionally connected to a further video selector 75 which is controlled by the processor 14 and which may comprise, further to the shown one output leading to the video input 74, still other, not shown outputs which are connected to video inputs of other appliances of the video installation. By means of the video selector 75, the processor 14 selects the set whose video input 74 the burst signal should be supplied to. The burst signal directly to be superimposed on the video signal is generated by a fixed frequency oscillator in the form of a 2 MHz sine signal and fed to the video selector 75 through a switch 78 having a function corresponding to that of the switch 52.

The superimposition may be performed, for example, by a simple adder circuit (not shown) having two inputs and one output, in its simplest form like a voltage divider. The two inputs are connected to the video signal source or to an output of the video selector 75, and the output goes to the video input 74. The injection of the burst can be done synchronously with the synchronization signal taken from the TV 4.

In the thereto analogous monitoring of the video connections 7 and 8, respectively, of the video recorders, the case has additionally to be considered that VCR₁ 2 or VCR₂ 3 is recording on a cassette whereas TV 4 displays another programme. In this case, the recorded signal must be synchronized with the video signal for providing it with the burst. To this end, either the signal available at the video output 60 is used, or directly the signal available at the video input 74. In the latter case, the outputs of the video selector 75 are constructed also as inputs of a synchronization controller incorporated into the video selector 75, which is activated by the processor 14 and derives the synchronization pulses from the video signal and liberates the burst. Thus, the video selector carries out the synchronization in an autonomous mode.

Another possibility is to connect a further input of the video selector 12 to the video input 75 and to carry out the synchronization, as described above, via detector 67 and processor 14.

Having now explained the detection and the feeding of the burst signal through video inputs and outputs of the video set, the burst detection by the probe 19 will now be discussed which is in particular used with television sets which do not have a video connection 10.

In the television set 4, the sound signal 55 is passed from the amplifier 80 to the built-in loudspeaker 81. The video signal 56 is transmitted by the conventional circuits for video signal processing 83 to the picture tube 85 and to the horizontal and vertical deflector coils 87 and 88, respectively.

The probe 19 is fastened to the outside of the housing of the television set 4. An arrangement as close as possible to the base of the picture tube is preferred, thus to the deflectors 87, 88 and to the supply lines 89 of the electron beam generating systems. This location is generally on the rear wall of the television set 4.

The probe 19 picks up the magnetic and electric stray signals particularly of the picture tube. The stray radiations emerging from other units of the television set 4 can be minimized by a corresponding positioning of the probe 19. The signal of the probe 19 is conducted through a shielded cable, preferably a conventional coaxial cable, to the corresponding input of the PIA where it is separated by three filters 92, 93 and 94. The filter 92 is a simple low pass filter which filters out the component corresponding to the frame repetition pulse. According to European standards, the frame repetition has a frequency of 50 Hz. The output of the filter 92 is connected to a comparator 96. The picture repetition synchronization signal 70 is available at the output of the comparator and is fed to the selector switch 72. The filter 93 is tuned to the line frequency which is 15,625 Hz according to European standards. It follows a comparator 97 which generates the line synchronization signal 69 which is also fed to the selector switch 72. The filter 94 is tuned to the burst frequency of 2 MHz. Its output signal is converted by a comparator 98 into a logic signal whose two states correspond to the presence and the absence of the burst.

It is preferred that the filters 92, 93, 94 are active ones, and the amplifier contained therein must have a high slew rate and a great band width since a very short transient time is required. Preferably, amplifiers of the state of the art should be used which have a slew rate of 250 to 1,000 V/μs and a band width of 100 to 200 MHz; higher values will bring about further improvements.

The data modulation of the burst is generated by the processor 14 in switching on and off the switch 52 or 78 in the corresponding rhythm, thus producing a 100% amplitude modulation of the burst. When the burst is retrieved from the video signal by the comparators 65 or 98, a pulse sequence is generated corresponding to the data instead of a longer lasting constant signal.

Figure 5:
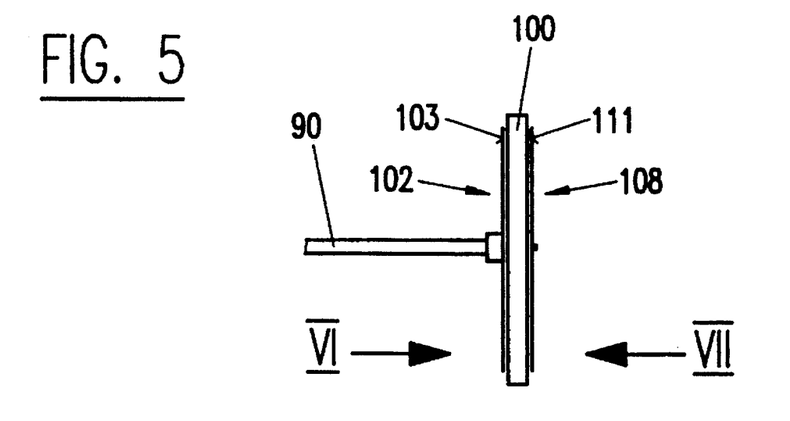
FIG. 5 shows a side view of the new detector for television sets.
Figure 6:
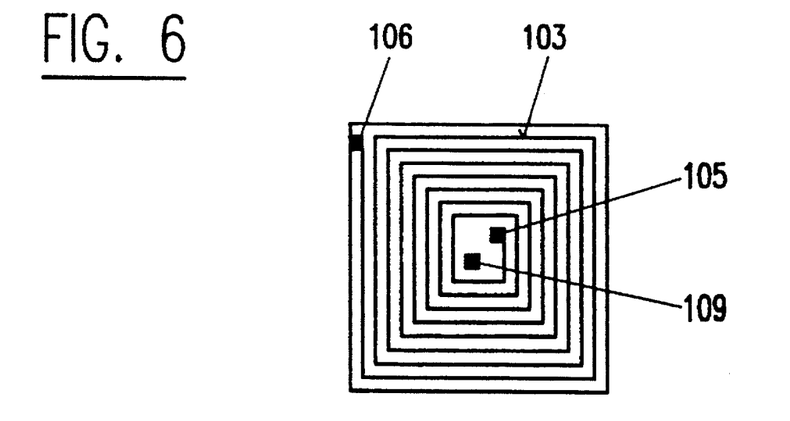
FIG. 6 shows the conductor path arrangement, viewed from VI in FIG. 5.
Figure 7:
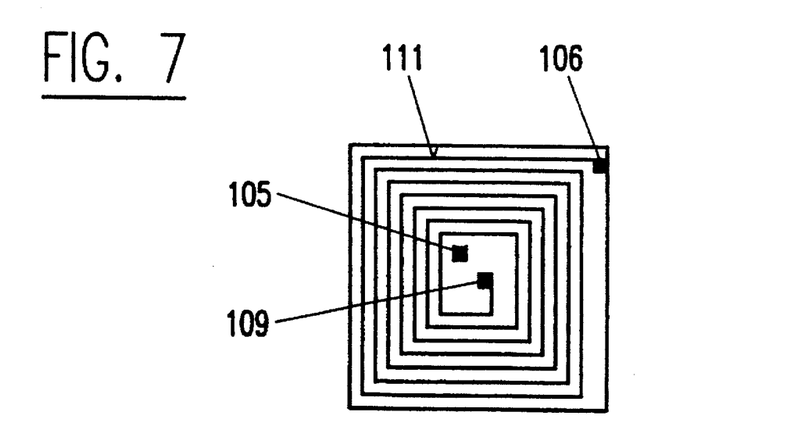
FIG. 7 shows the conductor path arrangement of the second detector coil, viewed from VII in FIG. 5.

FIG. 5 to 7 show the construction of the probe 19. It comprises a double sided copper-clad print board 100. FIG. 6 shows a view of the front side 102 where a spiral strip conductor 103 and three through contacts have been etched out. The spiral windings are executed as narrow as possible. The through contact 105 serves for the connection of the strip conductor 103 to the coaxial cable 90, the through contact 106 serves for the connection to the second coil on the rear side 108, and through contact 109 is the second connecting point for the coaxial cable 90.

FIG. 7 shows the rear side 108 of the print board 100 which carries also a spiral strip conductor 111 analoguous to the strip conductor 103. The two strip conductors 103 and 111 are connected together by the through contact 106 to form a coil which is able to detect magnetic fields. At the same time, the two strip conductors 103 and 111 form a plate capacitor wherein, at least at high frequencies, the self-inductivity of the two individual coils sufficiently separates the two capacitor surfaces, in spite of the d.c. short-circuit by the through contacting 106, in the a.c. mode.

A preferred embodiment of the probe 19 shows the following data:

| winding count | 52 per coil, total 104 |
|---|---|
| strip connector width | 0.2 mm |
| winding distance | 0.2 mm |
| ohmic resistance | 40 Ω |
| inductivity, measured | 450 µH |
| board surface | about 50 * 50 mm |

Figure 4:
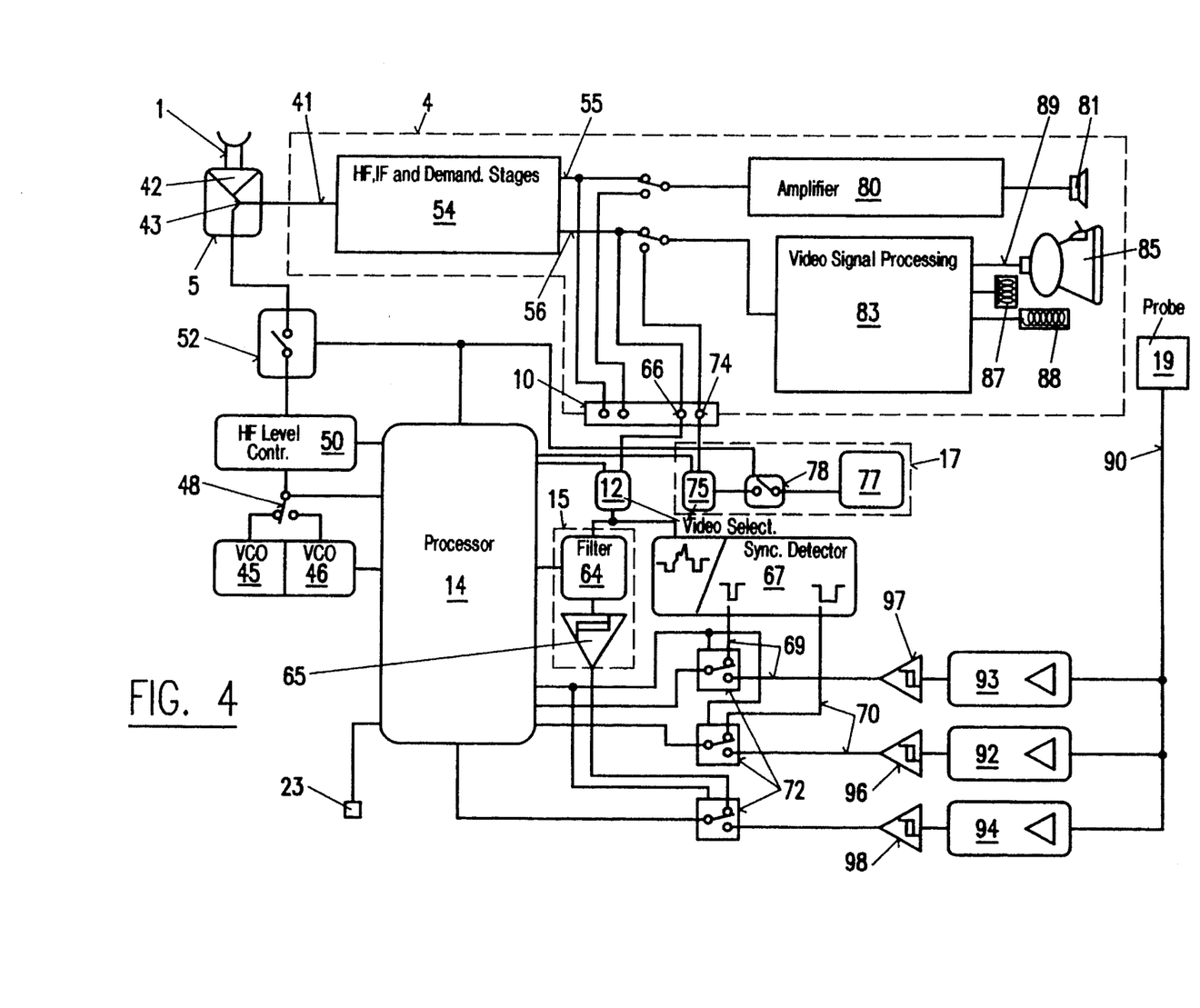
FIG. 4 shows the monitoring of a television set (TV) in more detail.

For the decoding of transmitter specific information contained in the television signal, additional functional groups not shown in FIG. 4 are provided. For example, a conventional VPS decoder element as it can be found in video recorders, may be used for decoding the VPS signal. This information, present from the outset, may in principle also be detected by the probe 19.

For the determination of the programme being displayed by the TV set 4, the processor injects into all channels successively a burst signal in a predetermined sequence. If it detects the presence of the burst signal in the reproduced television signal, the received channel is identified, and this information is transmitted via the output 23 to the central unit. When the channel has been recognized, it will be sufficient to inject in certain intervals, e.g. once a second, the burst for checking purposes into this channel only, until the burst can no longer be found due to a programme change. If this is the case, the processor 14 injects the burst first into the preferably selected channels. A priority list required for this action may be predetermined, or the processor 14 establishes an internal set of statistics how often and how long each channel has been selected. This priority rule enables a very rapid recognition of programme changes between preferred programmes. Another strategy is to prefer channels which are neighbours to the last selected channel in order to follow quickly a sequential switching over several channels.

If no channel is identified after running through all possible channels, the processor checks, if applicable, by injecting the burst into the video input whether a television signal is fed into the television set through the video inputs of the television set.

Of course, the searching procedure just described is only necessary if the processor 14 does not find a data modulated burst signal or a transmitter specific signal in the television signal which already provides the necessary information. However, the processor may additionally inject a burst signal into the television signal at the television connection 1 in order to determine whether the television signal comes from the television connection 1, i.e. a direct reproduction takes place, or whether the recording of a video recorder or a television signal derived from another source is displayed.

Where video recorders 2, 3 are present in the television installation, the processor will inject data modulated bursts into the channel to which a video recorder 2, 3 is presently tuned, in slightly greater time intervals. To this end, the video outputs 7, 8 of all video recorders are monitored for the occuring of a burst signal, and the tuning of the video recorder is derived therefrom. This is however done with lower priority than the determination of the tuning of the television set 4, i.e. with lower frequency and preferably only as long as the tuning of the television set 4 is known.

Modifications of the embodiment just described are obvious to the one skilled in the art. For example, only the quality of the burst signal is important for the function of the device and the avoiding of disturbing side effects so that the use of only one or also more than two VCOs 45, 46 may be considered.

| Abbreviations | |
|---|---|
| PIA | plug-in adapter |
| H pulse | horizontal synchronization pulse, line repetition pulse |
| HF | high frequency |
| TV | television set |
| V pulse | vertical synchronization pulse, picture repetition pulse |
| VCO | oscillator having digital or analogue control inputs for the frequency tuning (oscillator whose frequency is controlled by a control voltage) |
| VCR | video recorder |

I claim:

1. A method for determining a channel selection in a video installation comprising at least a television set and/or a video recorder and at least one input connection for a television signal, the method comprising the steps of:

injecting an identification signal into the television signal locally by superimposing the identification signal on a video component of a channel of the television signal in the form of a burst;

receiving and reproducing said channel of the television signal using the video installation;

determining the channel selection of the video installation based upon a presence of the identification signal in an output signal or a stray signal of the channel reproduced by said video installation;

detecting electric and magnetic stray fields emitted by a picture tube of a television set of said video installation using a probe which is disposed in a proximity of the television set;

producing a signal based on the stray fields detected by said probe; and separating the signal by filters into at least three partial signals, a first partial signal being used for determining a time of picture repetition, a second partial signal being used for determining a line repetition, and a third partial signal containing a burst.

2. The method of claim 1, further comprising the step of selecting the channel in which the identification signal is injected according to one or a combination of the following sequences:

selection only from channels used for television programs;

sequentially according to program numbers;

according to a predetermined priority list;

according to a sequence of decreasing utilization of the channel, a set of statistics on frequency and duration of a choice of a channel being continuously updated; and in the sequence of increasing distance to the last determined channel.

3. The method of claim 1, further comprising the steps of:

picking up a signal at a video output of at least one device of the video installation;

decoding information contained in the picked-up signal; and determining the channel and/or the program on which the device is tuned based on the decoded information.

4. The method of claim 1, further comprising the step of placing the identification signal in the output signal of the channel reproduced by the video installation so that the identification signal is not visible on a screen of the television set.

5. A device for determining a channel selection in a video installation comprising at least a television set and/or a video recorder and at least one input connection for a television signal, the device comprising:

means for infecting an identification signal into the television signal locally by superimposing the identification signal on a video component of a channel of the television signal in the form of a burst;

means for receiving said channel of the television signal in the video installation; and means for determining the channel selection of the video installation based upon a presence of the identification signal in an output signal or a stray signal of said video installation;

wherein an HF injector is inserted between an input of the video installation for a television signal and a television connection, a second input of said injector being connected to an output of a burst generator which provides a substantially sine shaped signal which is offset by a predetermined constant frequency difference with respect to a picture carrier of the television signal of a channel;

wherein the burst generator is composed of at least one signal generator having an adjustable frequency, and an HF switch by which a signal of the signal generator can be forwarded to the second input of the HF injector; and wherein a processor is provided which controls at least the HF switch and adjusts the frequency of the signal generator so that a burst of definite length and structure is able to be produced and to be superimposed with aid of the HF injector on the video component of the television signal of a determined channel selected by the processor.

6. The device of claim 5, wherein the frequency difference to the picture carrier of the television signal is in the range of from 1 MHz to 4 MHz.

7. The device of claim 5, wherein the burst generator produces a sine signal of low harmonic content wherein all harmonics except a fundamental frequency are attenuated by at least 40 dB with respect to a frequency of the sine signal.

8. The device of claim 5, wherein the signal generator comprises two partial signal generators with following frequency adjusting ranges covering together an entire frequency range of the receivable channels, respectively from 40 to 450 MHz and from 450 to 1,000 MHz, whose outputs are connected to an HF commuting switch, the output of which constituting the output of the signal generator.

9. The device of claim 5, wherein an HF level controller is disposed between the signal generator and the HF switch.

10. The device of claim 5, wherein synchronization means are connected to the processor for or determining a time of picture repetition and line flybacks of the picture display of the selected channel.

11. The device of claim 5, wherein a fixed frequency oscillator producing a sine signal of low harmonic content is provided whose output signal can be fed through electrical switching means, controlled by the processor, to at least one video input of a device of the video installation, and whose frequency equals a frequency difference between the picture carrier and the burst generator.

12. The device of claim 5, wherein burst detecting means are connected to the processor, said burst detecting means being connected to at least one video output of a device of the video installation, thus enabling detecting at the said video output the presence of a signal component having the frequency of the burst signal in the video signal by the processor, and the burst detecting means comprise at least one filter, switchable by the processor, for the burst frequency, and a following comparator.

13. The device of claim 5, further comprising at least one probe fastenable to a television set, said probe comprising two flat coils disposed in parallel relationship and having a first and a second end each, said first ends being electrically connected so that the inductive effects of the two coils are adding up, said second ends forming an output of the probe, said output being connected by conductive means to said processor.

14. The device of claim 13, wherein the probe comprises a double sided copper-clad board, and the two flat coils are worked as spiral strip conductors on both sides of the board out of the copper layer.

15. The device of claim 13, wherein said output of the probe is connected to a filter array which comprises at least the following filters:

a first filter pervious for the frequency of the burst signal;

a second filter pervious for the signal component produced by the line flybacks; and a third filter pervious for the signal component produced by the picture repetitions;

the outputs of the filters being connected each to one comparator, the output signals of the comparator being usable by the processor to recognize the line and picture repetitions as well as the burst signal.

* * * * *